(12) United States Patent
Robertson et al.

(10) Patent No.: US 11,854,415 B1
(45) Date of Patent: Dec. 26, 2023

(54) RADAR-BASED DISCOVERY TECHNOLOGIES FOR MANAGING AIR TRAFFIC

(71) Applicant: Fortem Technologies, Inc., Pleasant Grove, UT (US)

(72) Inventors: Adam Eugene Robertson, Provo, UT (US); Mikko Valimaki, Orem, UT (US)

(73) Assignee: Fortem Technologies, Inc., Pleasant Grove, UT (US)

( * ) Notice: Subject to any disclaimer, the term of this patent is extended or adjusted under 35 U.S.C. 154(b) by 85 days.

(21) Appl. No.: 16/379,477

(22) Filed: Apr. 9, 2019

Related U.S. Application Data

(60) Provisional application No. 62/655,506, filed on Apr. 10, 2018.

(51) Int. Cl.
*G08G 5/00* (2006.01)
*G01S 13/91* (2006.01)
*G01S 13/95* (2006.01)

(52) U.S. Cl.
CPC ............ *G08G 5/0082* (2013.01); *G01S 13/91* (2013.01); *G01S 13/951* (2013.01); *G08G 5/0091* (2013.01)

(58) Field of Classification Search
CPC .... G08G 5/0082; G08G 5/0091; G01S 13/91; G01S 13/951
See application file for complete search history.

(56) References Cited

U.S. PATENT DOCUMENTS

| | | | |
|---|---|---|---|
| 9,171,476 B2 | 10/2015 | White et al. | |
| 9,417,325 B1* | 8/2016 | Bry | ........................ B64C 39/024 |
| 2006/0146048 A1* | 7/2006 | Wright | ................... G01C 23/00 |
| | | | 345/419 |
| 2012/0218127 A1 | 8/2012 | Kroen | |
| 2016/0260331 A1 | 9/2016 | Salentiny et al. | |
| 2016/0275801 A1 | 9/2016 | Kopardekar | |
| 2016/0364989 A1 | 12/2016 | Meulmester et al. | |
| 2017/0285158 A1 | 10/2017 | Halbert et al. | |
| 2018/0129881 A1* | 5/2018 | Seeber | ...................... B64D 1/02 |
| 2018/0130358 A1* | 5/2018 | Prusak | ................. G08G 5/0043 |
| 2018/0364713 A1* | 12/2018 | Foster, II | ............... G05D 1/104 |
| 2019/0114925 A1* | 4/2019 | Schulman | ............... G06F 21/31 |
| 2020/0105149 A1* | 4/2020 | Mahkonen | ........... G08G 5/0013 |

FOREIGN PATENT DOCUMENTS

WO    WO 2016/030656 A1    3/2016

* cited by examiner

*Primary Examiner* — Rachid Bendidi
*Assistant Examiner* — Sahar Motazedi

(57) ABSTRACT

Systems, methods, and computer-readable media are described for radar-based object discovery and airspace data collection and management. In some examples, a data service system deploys radars across geographic areas based on a respective radar detection range of the radars and a coverage parameter for the geographic areas, wherein each of the radars is configured to detect object parameters within the respective radar detection range. The data service system collects the object parameters from the radars, determines weather conditions and/or airspace regulations associated with the geographic areas, and models airspace conditions for the geographic areas based on the object parameters and the weather conditions and/or airspace regulations.

20 Claims, 11 Drawing Sheets

RADAR-BASED DISCOVERY TECHNOLOGIES FOR MANAGING AIR TRAFFIC

PRIORITY

This application claims priority to U.S. Provisional Patent Application No. 62/655,506 filed on Apr. 10, 2018, the contents of which are hereby expressly incorporated by reference in their entirety.

The present technology pertains to radar-based networks and data collection for air traffic management and flight planning.

BACKGROUND

The widespread adoption of aircraft, drones and other airborne vehicles has created congested airspaces, increasing the risks of airspace collisions and the difficulty of managing airspace traffic. Governments across the globe have enacted rules and regulations to reduce the risk of airspace collisions and increase safety standards. However, the emergence and increasing popularity of unmanned aircraft systems have further complicated airspace management and flight planning by increasing the number and type of aerial obstacles. Moreover, the adoption of unmanned aircraft systems, such as drones, for civilian applications is expected to present a new set of challenges in managing and regulating airspace. Governments have attempted to address this new set of challenges by modifying airspace rules and regulations in an effort to increase safety and protect national security. While airspace regulations can provide necessary protections and safety standards, they also increase the complexity of airspace travel. And as the airspace becomes increasingly congested with aircrafts and obstacles, the dangers and challenges of airspace travel will continue to rise. It is thus increasingly important to have an adequate understanding and visibility of ground and airspace conditions for safe, lawful, and effective airspace travel. Further, with drones becoming more popular in relatively low airspace, other objects likes trees, power lines, cell towers, and the like, can cause issues for drone flight.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
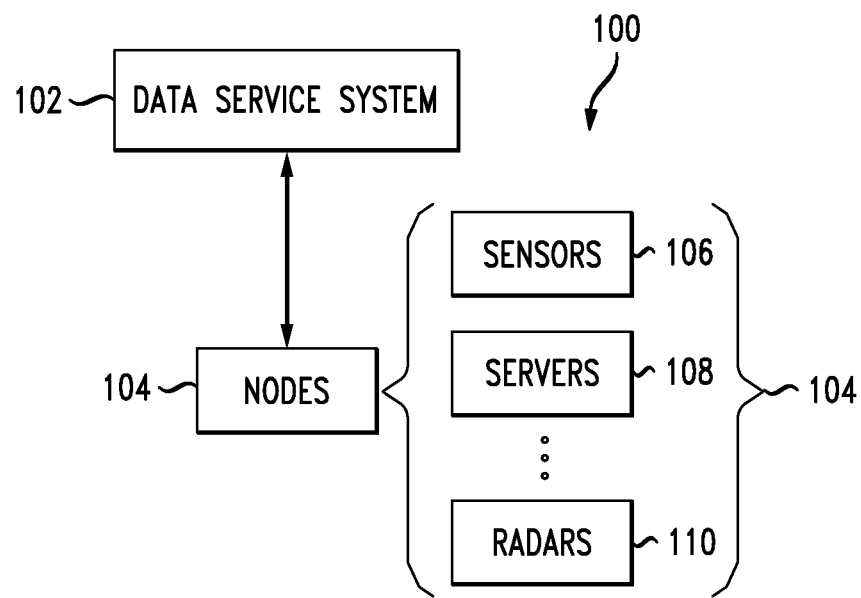
FIG. 1A illustrates an example sensor-based network and object discovery architecture for aircraft planning and managing operations.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DESCRIPTION

The disclosed technology addresses the need in the art for comprehensive object discovery and data collection systems for airspace management and flight operations. The present technology involves system, methods, and computer-readable media for radar-based networks and data collection systems for aircraft planning and air traffic control operations. The disclosed approaches allow deployment of radars and sensors across one or more geographic regions to collect radar and sensor data for the geographic regions. The radar and sensor data can depict airspace conditions and patterns across the one or more geographic regions, including presence and movement of objects which can affect the airspace conditions in the geographic areas. Other data pertinent to airspace and traffic management can be collected such as weather, airspace regulations, etc. The combined data can be stored, aggregated, organized, fused, etc., for determining airspace and traffic conditions, generating flight plans, altering flight plans, generating airspace notifications and alerts, servicing product delivery requests, and managing airspace distribution of products. The combined data can prevent airspace collisions, track objects on the ground and/or airspace across the one or more geographic areas, detect ground and airspace obstacles, and avoid emergencies.

Figure 1B:
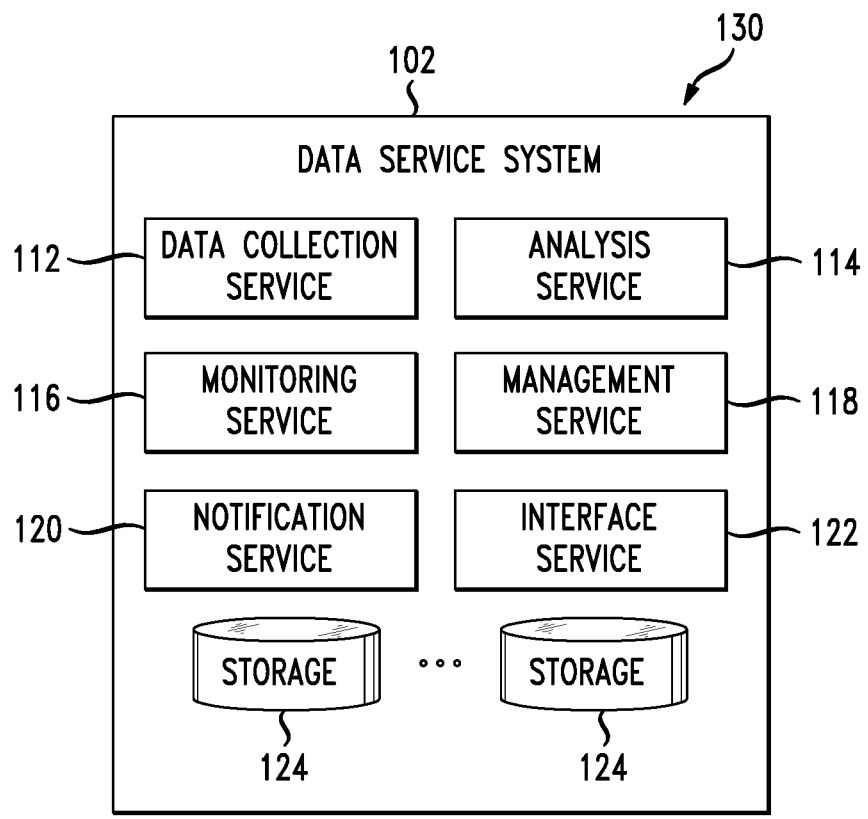
FIG. 1B illustrates an example configuration of a data service system as shown in FIG. 1A.

The present technology will be described in the following disclosure as follows. The discussion begins with a discussion of example sensor-based networks and object discovery architectures, as illustrated in FIGS. 1A-B. A discussion of radar-based object discovery and flight planning operations, as shown in FIGS. 2 through 7, will then follow. The discussion concludes with a description of an example computing device, as illustrated in FIG. 8, including example hardware components suitable for hosting software applications and performing computing operations. The disclosure now turns to FIG. 1A.

FIG. 1A illustrates an example sensor-based network and object discovery architecture 100 for aircraft planning and managing operations. The architecture 100 includes a plurality of nodes 104 deployed across one or more geographic areas (e.g., city, state, zip code, country, region, etc.) and configured to detect objects and conditions in the one or more geographic areas.

The nodes 104 can include one or more sensors 106, servers 108, or radars 110. The sensors 106 can include, for example, image sensors, motion sensors, noise sensors, light sensors, CMOS sensors, flame detection sensors, proximity sensors, machine vision sensors, smart scene sensors, tracking sensors, video or image sensors, speed sensors, smoke sensors, pressure sensors, moisture sensors, humidity detectors, heat sensors, position sensors, air flow sensors, chemical sensors, weather instruments, etc.

The servers 108 can include any computing devices with networking capabilities, such as computer servers, laptops, routers, smartphones, IoT devices, cameras, access points, traffic systems, etc. The radars 110 can include any device with radar capabilities, as well as other capabilities. The radars 110 can also include other detection sensors. In one aspect, a roving radar system can be attached to a drone and deployed to capture additional data in a specific zone. This data can be then correlated by the data service system 102 with other data from stationary radars and any other radars or sensors.

The radars 110 can send and receive radio waves and detect objects according to radar technologies. The radars 110 can use radio frequency waves to measure various parameters such as range, velocity, angular direction, target size, target shape, moving parts, etc. The radars 110 can also track objects and predict object movement and/or positioning.

Figure 3A:
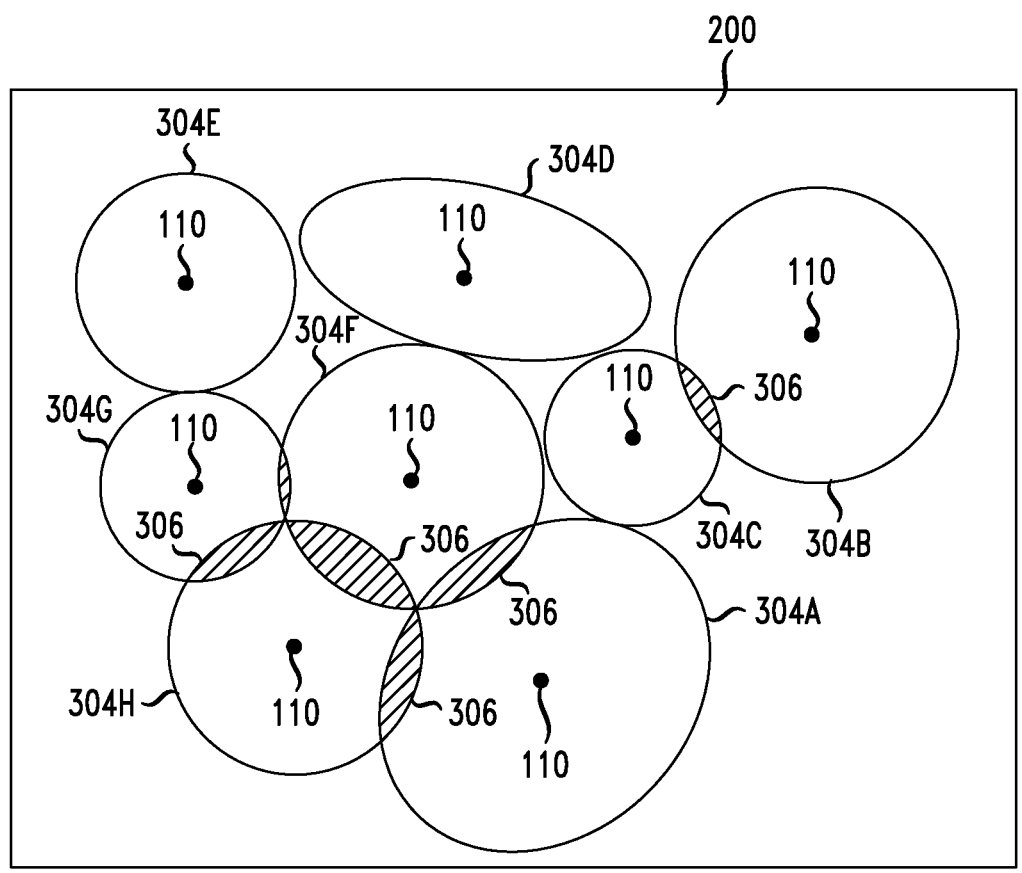
FIG. 3A illustrates an example topology of radars for detecting objects in the example geographic area shown in FIG. 2.

The nodes 104 can be deployed across the one or more geographic areas based on one or more topologies and configurations which can depend on the desired coverage, redundancy, data integrity, etc. For example, the nodes 104 can be deployed in the one or more geographic areas to ensure maximum coverage across the one or more geographic areas. The topology for maximum coverage can be determined based on the number of nodes 104, the respective detection and/or communication ranges of the nodes 104, the topology of the one or more geographic areas, etc. In some examples, the nodes 104 can be deployed with overlapping coverage for greater redundancy, data and object verification capabilities, accuracy, timeliness, etc. The nodes 104 deployment of the nodes 104 can also be tailored to enable communication and interaction between nodes based on, for example, range and/or communication parameters. Example topologies and deployment strategies are shown in FIG. 3A and further described below.

The nodes 104 can collect data, including sensor measurements and calculations, and send the collected data to a data service system 102 via one or more networks. The data service system 102 can include one or more computing devices, such as one or more computer servers, storage devices or networks, data centers, etc. In some cases, the data service system 102 can be a distributed system of infrastructure across one or more networks or devices. The data service system 102 can also host one or more applications and software services, such as virtual machines (VMs), software containers, software applications, service functions, logical devices, etc.

The data service system 102 can receive the data from the nodes 104 and collect the data, store the data, organize the data, fuse the data, process the data, filter the data, sanitize the data, enhance the data, perform calculations based on the data (e.g., machine learning and artificial intelligence calculations, etc.), report the data and/or calculations from the data to other systems or entities, etc. For example, the data service system 102 can collect data from various nodes and maintain a repository of the data for use by the data service system 102 and/or other systems or entities in managing aircraft operations and making calculations or projections such as flight plans for aircrafts (e.g., drones), air traffic control decisions, airspace projections, airspace alerts, aerial views, flight alterations, emergency notifications, traffic patterns, etc. The nodes 104 can communicate the data to data service system 102 via one or more networks. In some aspects, the nodes 104 can use CDMA, FDMA, TDMA, OFDMA, or any other type of channeling protocol to communicate the data. For example, the radars 110 can use CDMA, FDMA, TDMA, OFDMA, etc., to communicate radar data for detecting and evaluating conditions in a 3D space. In some aspects, the nodes 104 can use any other wireless communication scheme, such as WIFI (e.g., via a WIFI access point), or any wired communication scheme (e.g., telephone line, cable line, fiber optic line, Ethernet cable, etc.).

The data service system 102 can fuse and/or filter data and implement various machine learning technologies for dynamic and intelligent airspace discovery, prediction, and management operations. The data service system 102 can receive requests from other systems and/or entities and provide collected data (raw and/or processed) and/or calculations. The data service system 102 can also manage the operation and configuration of the nodes 104. For example, the data service system 102 can trigger sensing and collecting operations by one or more nodes 104, activate and/or deactivate one or more nodes 104, modify software and/or operation parameters of the nodes 104, modify node behavior, route data from the nodes 104, define data collection filters or parameters, etc.

FIG. 1B illustrates an example configuration of the data service system 102. In this example, the data service system 102 includes a data collection service 112, an analysis service 114, a monitoring service 116, a management service 118, a notification service 120, an interface service 122, and one or more storages 124. The services 112, 114, 116, 118, 120, 122 can be hosted on a single system, such as a server, or multiple systems. For example, the services 112, 114, 116, 118, 120, 122 can be hosted on one or more servers, data centers, networks, clouds, etc. In some cases, the services 112, 114, 116, 118, 120, 122 can be distributed across one or more networks or environments.

The data collection service 112 can manage collection and storage of data from the nodes 104 as well as any other sources, such as the Internet or an organization. The analysis service 114 can analyze collected data to filter the data, fuse the data, sanitize the data, interpret the data, generate statistics, and/or perform calculations and operations based on the data. Example calculations and operations include, without limitation, machine learning or artificial intelligence calculations or predictions, pattern identification, detection and/or recognition operations, notification operations, statistical analysis, planning and/or scheduling operations, etc.).

The monitoring service 116 can perform monitoring operations based on data collected from the nodes 116, as well as data and/or requests from external sources and entities. For example, the monitoring service 116 can monitor the data from the nodes 116, monitor conditions detected from the collected data, monitor activities by one or more objects (e.g., buses, cars, aircrafts, humans, computers, etc.), monitor rules or regulations (e.g., government regulations), monitor requests (e.g., operator requests, client requests, government requests, vehicle requests, etc.), etc.

The management service 118 can manage the nodes 104 and/or the data service system 102. For example, the management service 118 can manage the behavior and configuration of the nodes 104, as well as the configuration, operation, and performance of the services 112, 114, 116, 120, 122. The management service 118 can also manage requests from external systems or entities, such as data or service requests and transactions. For example, the management service 118 can manage requests for data or generated information (e.g., flight plans, schedules, ground and/or aerial views, recognition information, etc.) from one or more systems or entities, such as a transportation service operator, a government agency, a business (e.g., a distributor, merchant, shopping service, trading service, online data or service provider, etc.), a utility company, a municipality, an air traffic controller, a hospital, etc. The management service 118 can also plan or manage activities and operations for other systems or entities. For example, the management service 118 can plan or manage flight plans, traffic plans, transportation routes (air and/or ground), transportation schedules, drones, services, product deliveries (e.g., plans, routes, schedules, timing, etc.), and so forth.

The notification service 120 can manage alerts and notifications generated by the data service system 102. Example alerts and notifications include, without limitation, flight alteration notifications, emergency alerts, warnings, error notifications, threat notifications, airspace alerts, traffic pattern notifications, weather alerts, health alerts, service notifications (e.g., product delivery notifications, service notifications, etc.), reports, etc. The notification service 120 can include rules and triggers for generating various types of alerts and notifications, and parameters for determining when and/or where to send alerts and notifications. The notification service 120 can work with the data collection service 112, analysis service 114, monitoring service 116, management service 118, and interface service 122 in generating and sending alerts or notifications.

The interface service 122 can manage communications between the data service system 102 and the nodes 104, as well as communications between the data service system 102 and other communication sources and destinations (e.g., operators, external networks or devices, government agencies, etc.). The interface service 122 can include one or more network interfaces (wired and/or wireless) for communicating and exchanging information. The interface service 122 can also host websites, portals, APIs, etc., for communicating with one or more networks and systems.

The storage 124 can include one or more storage devices and/or networks for storing data collected from the nodes 104 and any other sources, as well as information used or generated by the data service system 102 such as flight plans, schedules, rules, regulations, parameters, configurations, requests, profiles, service information, output data, etc. The storage 124 can include the hardware infrastructure for the data service system 102 to store data, software, etc.

The services 112, 114, 116, 118, 120, 122 and storage 124 can work independently and/or in combination to perform the various services and operations for the data service system 102. Moreover, the services 112, 114, 116, 118, 120, 122 and storage 124 are provided as an example configuration of the data service system 102 for illustration purposes. It should be noted that other examples or configurations can include more or less services, infrastructure, components, arrangements, etc. One of ordinary skill in the art will also recognize that the data service system 102 can also include other services, infrastructure, components, arrangements, etc., than those illustrated in FIG. 1B.

Figure 2:
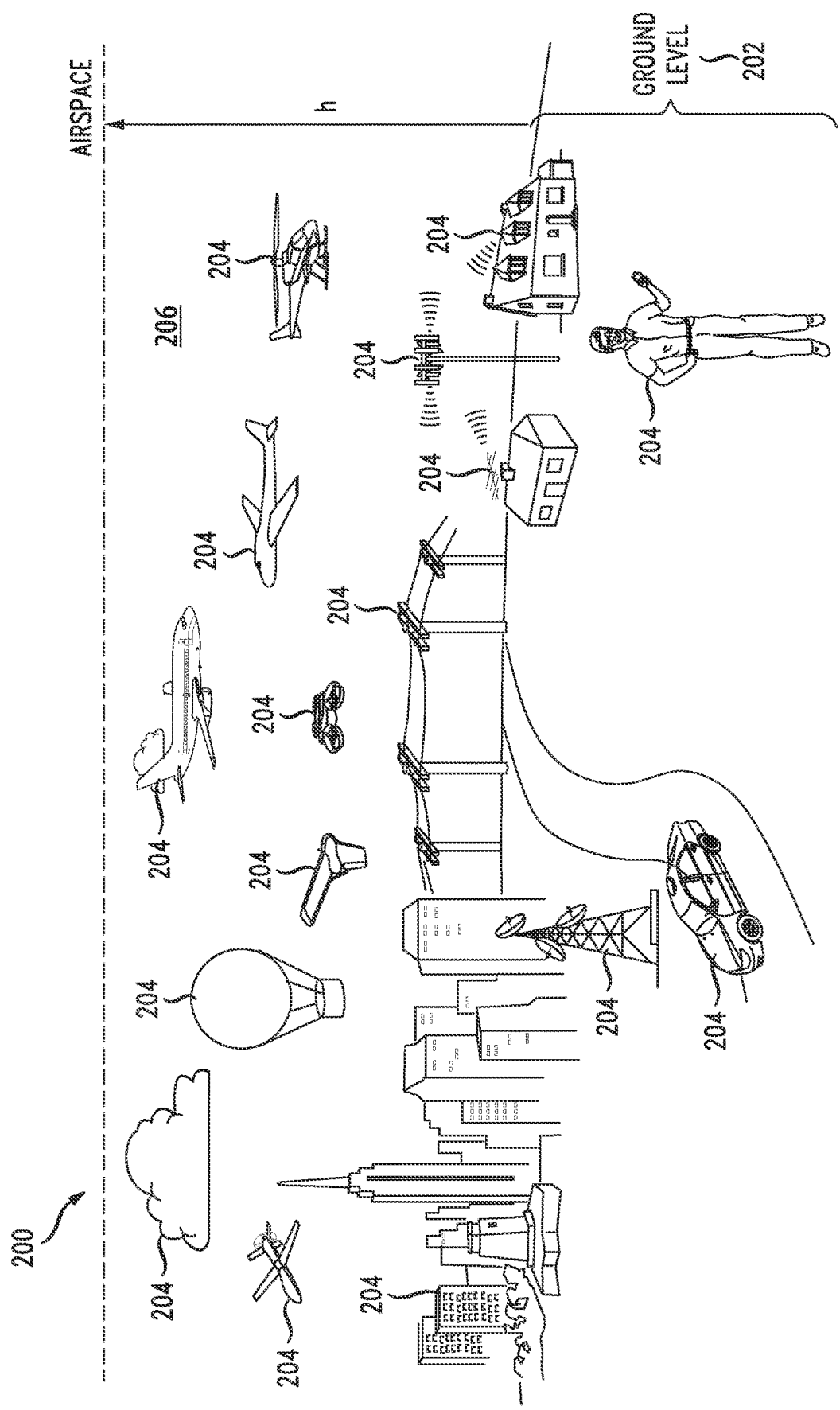
FIG. 2 illustrates an example geographic area for object discovery and data collection in sensor-based deployments.

FIG. 2 illustrates an example geographic area 200 for object discovery and data collection in sensor-based deployments. In this example, the geographic area 200 depicts example objects 204 at ground level 202 and in airspace 206. The objects 204 can be static or in motion. The objects 204 can be statically located and/or move about anywhere within ground level 202 and the airspace 206.

The objects 204 can include, without limitation, vehicles, buildings, trees, people, animals, communication towers, powerlines, geologic objects, clouds, weather elements, waves, antennas, etc. The objects 204 can include various types of obstacles and vehicles at various levels of the airspace 206. For example, the objects 204 in airspace 206 can include helicopters, airplanes, air balloons, air taxis, gliders, drones, birds, kites, etc.

The number, type, and/or behavior of the objects 204 in the geographic area 200 can vary at different times. For example, the number, type, and/or behavior of vehicles can vary based on the time of the day, the season, weather conditions, traffic patterns, or other conditions. To illustrate, the number of vehicles in the geographic area 200 can be greater during the day than at night, or may decrease during weather events.

FIG. 3A illustrates an example topology of radars 110 for detecting objects in the geographic area 200. In this example, the radars 110 are positioned within the geographic area 200 based on their detection ranges 304A-H. The radars 110 can detect objects (e.g., 204) and conditions within their ranges 304A-H, and collect measurements and data pertaining to objects and conditions detected within the ranges 304A-H of the radars 110. The data collected for a detection range can identify objects detected within the detection range, as well as a distance of a detected object, a velocity of a detected object, an angular direction of a detected object, a size and/or shape of a detected object, moving parts of a detected object, a composition of a detected object, a projection of a detected object, etc. The data can be collected and stored or tagged along with additional information such as a time of detection, an area of detection, a radar associated with the data, etc.

Different radars can have different ranges depending on the hardware and software implemented by the different radars. The ranges 304A-H in this example can be based on the detection capacities of the radars 110 and/or the detection confidence levels desired from the radars 110. For example, one or more of the ranges 304A-H can be based on the maximum range capacity of one or more respective radars 110. In this example, such radars 110 can detect objects up to a distance which defines their respective maximum range capacities.

In some examples, one or more of the ranges 304A-H can be less than the maximum range capacity of a respective radar. For example, the range of a radar can be set by a distance that the radar can detect objects within a particular confidence or accuracy. To illustrate, assume a radar has a maximum detection range of 100 meters. Assume the accuracy of the radar decreases to a 50% accuracy level at 75 meters and continues to decrease until a minimum accuracy level at 100 meters. The radar may not be able to detect objects further than the 100 meters or may become too unreliable after 100 meters. Thus, if an accuracy level above 50% is desired for this specific radar, the range of the radar can be set to less than 75 meters. The radar can thus be positioned in the geographic area 200 within less than 75 meters of another radar (or an area that is not of interest), to ensure the measurements from the radar are within the desired accuracy of above 50%. If coverage above 50% accuracy is desired for an area beyond the 75 meters, another radar can be positioned within that area to ensure such coverage.

The number and position of the various radars 110 can be adjusted to ensure a desired coverage and accuracy is obtained. Moreover, the accuracy need not be uniform across all radars 110. For example, if one region within the geographic area 200 is of greater interest than another region, the radars 110 can be positioned such that radars within the region of greater interest are limited to a smaller range that yields higher accuracy and radars within the region of lesser interest are allowed a greater range that yields a lower accuracy.

The relative position and distance of the radars 110 can be based on the respective ranges 304A-H calculated for the radars 110, as well as the desired coverage and accuracy as previously explained. In some examples, the radars 110 can be positioned in a mesh topology based on the ranges 304A-H to ensure complete coverage of one or more regions in the geographic area 200. The radars 110 can also be positioned within a respective communication range to allow the radars 110 to communicate with each other and exchange information. The radars 110 can exchange information and send requests to each other. For example, the radars 110 can request measurements from each other for verification or expanded visibility.

The radars 110 can also be positioned to generate overlapping areas 306 of coverage based on the ranges 304A-H. The overlapping areas 306 can be areas within the range of two or more radars. The overlapping areas 306 can be adjusted or calculated based on one or more factors, such as accuracy level, redundancy desired, etc. For example, if a specific region is of high interest, has high levels of activity, and/or a high number of obstacles, the radars 110 can be positioned to create an overlapping area 306 over the specific region. The overlapping area 306 can provide redundancy, enable verification of measurements, or increase granularity of focus and/or detection. For example, the radars 110 associated with ranges 304B and 304C can be positioned such that the ranges 304B and 304C overlap to create an overlapping area 306. The radars 110 associated with the ranges 304B and 304C will both be able to obtain measurements and/or detect objects within the overlapping area 306. The measurements and/or detections from both radars 110 can be analyzed and compared to verify measurements or detections. This verification can be used to ensure accuracy and reliability of the data, detect false positives, monitor performance of radars, etc.

In some cases, an algorithm can be implemented to manage, fuse, reconcile, analyze, and interpret the data collected from multiple radars for an overlapping area. In one aspect, once the data is in its canonical format, the data points from multiple radars can be compared with latitude/longitude/altitude data (LLA) and VelocityNED (velocity North, East and Down) data based on the GPS time stamps. The algorithms cannot make absolute comparisons due to some bias in the detection angles and range of the radars but rather have to allow for some variation. The algorithm gets more complex as more objects are being monitored at once.

In one example, in an overlapping area, the same object may be detected by two or more radar 110 in the network. The algorithms can harmonize that data to insure that the overall system evaluation of the airspace accurately includes a single object rather than multiple objects. For example, the data service system 102 can perform deduplication, merging, and/or filtering operations on data received from multiple radars 110 pertaining to an overlapping area associated with the multiple radars 110. To illustrate, if the data service system 102 determines, from the data reported by the radars 110, that both radar Y and radar Z reported detecting object A at location B, the data service system 102 can deduplicate these duplicate reports by matching the results. If radar Y reports additional details, such as a shape of the object A, not otherwise reported by radar Z, the data service system 102 can add this data to the deduplicated data such that the final data includes one instance of object A at location B as well as data pertaining to the shape of the object A. If the data service system 102 determines that radar Y and radar Z have reported conflicting data about the same object (e.g., object A) for the same (or significantly similar) timeframe (e.g., timestamp 2017-07-04 12:09:03), the data service system 102 can reconcile the conflict (e.g., based on confidence levels; measurements from other sensors; a trajectory of the object ascertained from measurements of radars Y, Z, and/or any other sensors/radars; historical patterns; machine learning projections; etc.) and/or request additional or follow up measurements from radar Y and Z which the data service system 102 can use to verify, compare, and update the previous results.

To reduce noise and interference, increase performance and communications quality, the radars 110 can implement channelization for communications over one or more frequencies. For example, the radars 110 can use channel access schemes such as CDMA and FHSS. The radars 110 can also use other wireless communications. For example, one or more of the radars 110 can wirelessly communicate with an access point or network device via WIFI. In some cases, one or more of the radars 110 can communicate via a wired connection to a network, such as a telephone line, a fiber-optic cable, or an Ethernet cable.

As previously mentioned, the radars 110 can collect measurements and data pertaining to objects and conditions detected within the detection ranges 304A-H. The collected data can be used to perform object recognition, detect and project conditions in the geographic area 200, plan and schedule routes through the geographic area 200 for vehicles (e.g., drones), perform route alterations, predict condition changes, implement proactive adjustments, etc.

Figure 3B:
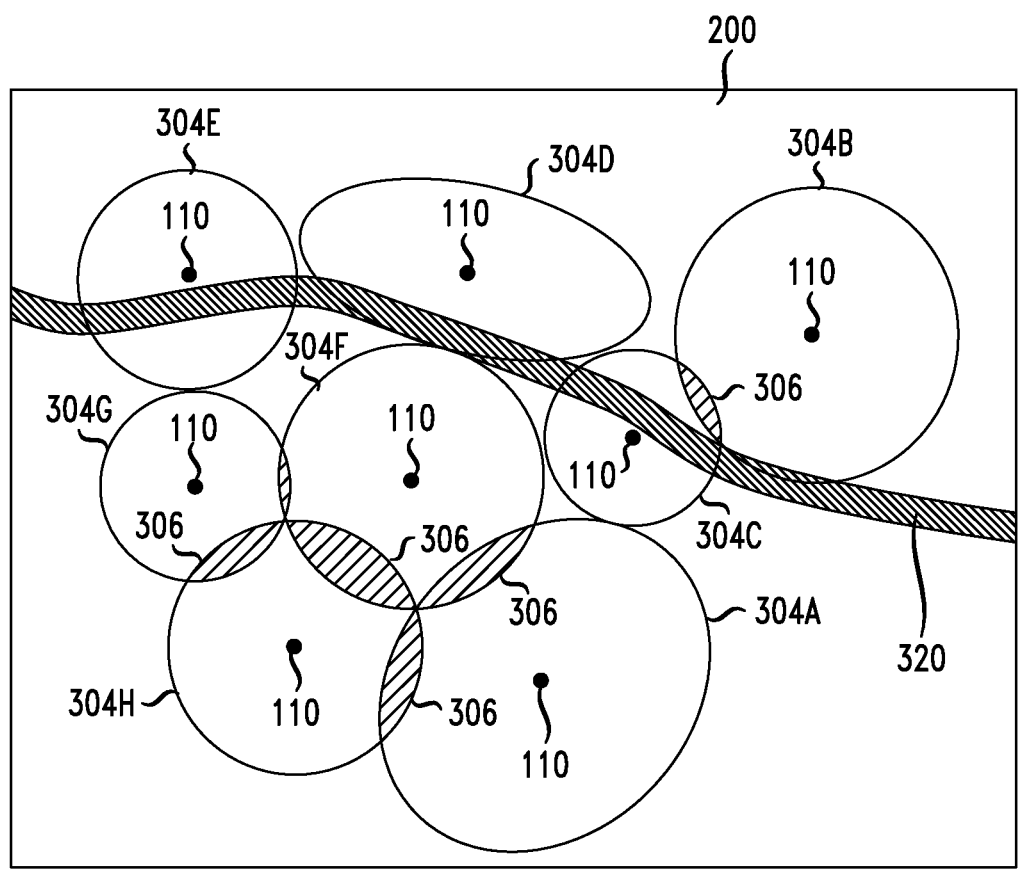
FIG. 3B illustrates an example path calculated through the example geographic area.

FIG. 3B illustrates an example path 320 calculated through the geographic area 200. The path 320 can be a route through various detection ranges (e.g., 304B, 304C, 304D, 304E) for an aircraft, such as a drone. The path 320 can be calculated based on the data collected from sensors 110 and a destination point. For example, the path 320 can be calculated by defining a route through the geographic area 200 and towards a destination, in view of objects detected in the geographic area 200 and any predicted changes in objects or conditions in the geographic area 200. To illustrate, the path 320 can be a route calculated for a drone to deliver a package to a destination at a specific time. The path 320 can be calculated by the data service system 102 or a separate entity/system based on data collected by the data service system 102 from the radars 110 as well as any other sources (e.g., nodes 104, Internet, etc.).

The path 320 can be designed to avoid other objects (e.g., objects 204) in airspace, and comply with any air traffic rules or regulations pertaining to the geographic area 200. The path 320 can take into account the objects detected in the geographic area 200, the movement and position of such objects, the projected path or trajectory of such objects, the altitude of such objects, the detection patterns for the geographic area 200, the weather conditions for the geographic area 200, etc. The path 320 can define one or more altitudes, directions, velocities, etc., calculated based on objects and conditions in the geographic area 200.

The radars 110 can continue radar detection and measurement operations while a vehicle is traveling through the path 320 and make path adjustments based on the data collected at the geographic area 200. For example, as a drone travels through the path 320, if a radar detects an object within a threshold proximity or projected to reach a threshold proximity of the drone, the data about the object can be used to alter the path 320 to avoid the object. The path 320 can also be altered based on changing conditions and other paths. For example, the altitude and/or direction of the path 320 can be adjusted at one or more regions based pressure conditions, weather conditions, air traffic patterns, time constraints, detected risks or objects, etc. The radars 110 can also track an object, such as a drone, as it travels through the path 320, and detect any deviations in the object's trajectory and its surrounding environment.

The data can also be fed to a scheduling service that can utilize the data and establish or alter a route of an airborne vehicle. The route can be corrected or altered or established based on the data about the status of the airspace. The system or scheduling service can utilize one or more of the following data points to establish and/or later alter airborne vehicle routes: data about the airspace, predictive data about the airspace, data about scheduled flights of one or more airborne vehicles, data about current airborne vehicles including a condition of each vehicle, an expected success or failure of vehicle delivery and return, a size of a vehicle, a speed of the vehicle, a cargo of each respective vehicle, a size or shape of each vehicle with or without cargo, and so forth. Any portion of this data can be used by the scheduling service to determine a timing, a path, an elevation, a changing elevation along a path, a collision avoidance alteration, and so forth. The path can be a 3D route which can involve sending the vehicle to certain elevations for parts of the trip.

Figure 4A:
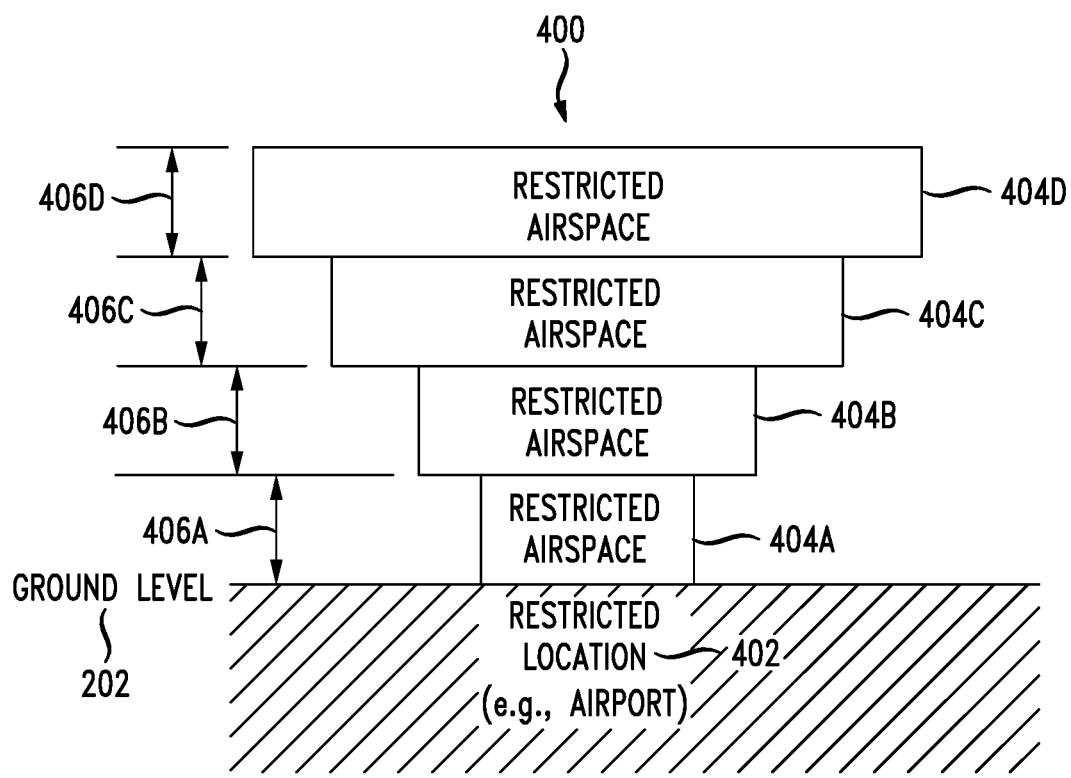
FIG. 4A illustrates a diagram depicting airspace regulations for a restricted location.

With reference to FIG. 4A, the path 320 can take into account airspace regulations at different locations and altitudes. FIG. 4A illustrates a diagram depicting airspace regulations 400 for a restricted location 402. The restricted location 402 can be, for example, an airport, a hospital, a government building, or any region restricted by one or more governments or entities. For example, the restricted location 402 can be an airport which often has restricted airspace which prevent unauthorized aircrafts from traversing the restricted airspace defined for the airport.

The restricted location 402 can have restricted airspaces 404A-D defined by rules or regulations for the restricted location 402. The restricted airspaces 404A-D can vary based on altitude and/or distance from the restricted location 402. For example, from ground level 202 to a first altitude 406A, the restricted location 402 can have a restricted airspace 404A with a specific footprint or coverage. From the first altitude 406A to a second altitude 406B, the restricted location 402 can have a different restricted airspace 404B. From the second altitude 406B to a third altitude 406C, the restricted location 402 can have another restricted airspace 404C. Finally, from the third altitude 406C to a fourth altitude 406D, the restricted location 402 can have yet another restricted airspace 404D.

In this example, the size of the restricted airspaces 404A-D increases as the altitude increases. However, in other examples, the size of the restricted airspaces 404A-D may decrease as the altitude increases or remain substantially similar at the various altitudes 406A-D.

When calculating a path (e.g., 320) for an aircraft, such as a drone, the restricted airspaces 404A-D should be avoided unless the aircraft has the appropriate permissions to travel across the airspaces 404A-D. Thus, the path of the aircraft across a geographic area (e.g., 200) can change directions and altitude to avoid the restricted airspaces 404A-D as well as any objects detected by the radars 110. The data service system 102 can collect and track rules and regulations pertaining to air and/or ground travel to identify restricted locations (e.g., 402) and airspaces (e.g., 404A-D), account for other vehicles and their scheduled routing paths through an airspace, and account for the restricted locations and airspaces when calculating paths for air travel. Emergency situations, such as a drone with an emergency medicine, could be given a high priority such that they are allowed to go through restricted airspace or other drones may be altered in their path to make room for the emergency drone. Notices could go out to airports or other authorities about such paths so they can expect the vehicle in the airspace.

Figure 4B:
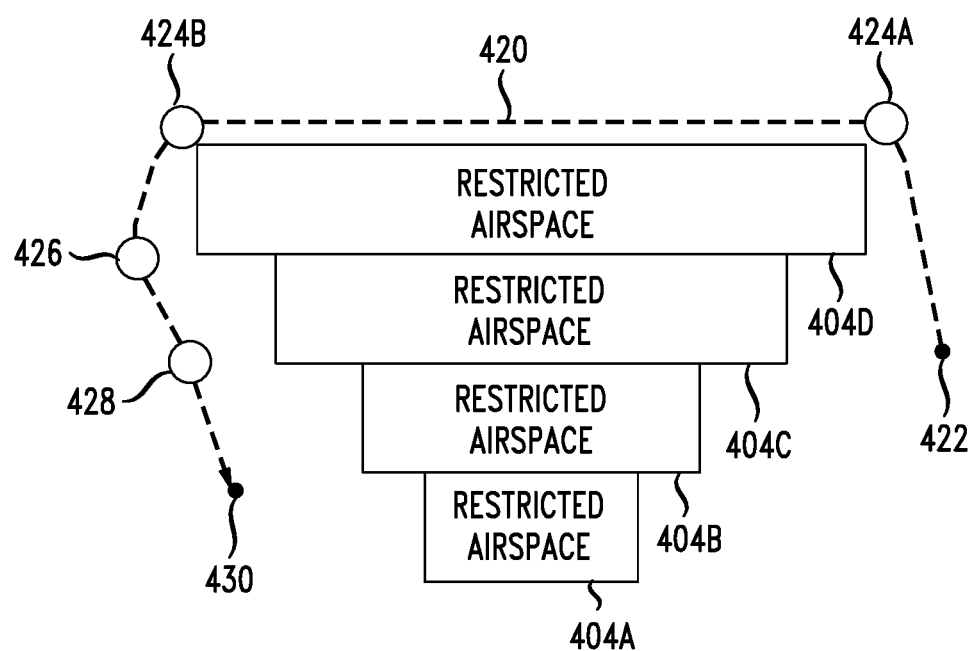
FIG. 4B illustrates a path calculated to avoid the restricted airspaces shown in FIG. 4A.

FIG. 4B illustrates a path calculated to avoid the restricted airspaces 404A-D when traveling from a starting location 422 to a destination 430. The path in this example involves changes in direction and/or altitude at points 424A, 424B, 426, and 428 based on the restricted airspaces 404A-D. The path between points 424A and 424B represent an altitude and/or route defined for avoiding the restricted airspace 404D at the altitude 406D. The points 424B and 426 represent a variation in the altitude and/or direction of the path calculated to avoid restricted airspace 404C, and the points 426 and 428 represent another variation in the altitude and/or direction of the path calculated to avoid the restricted airspace 404B. The path between points 428 and 430 represents the final segment to the final destination 430.

Figure 5:
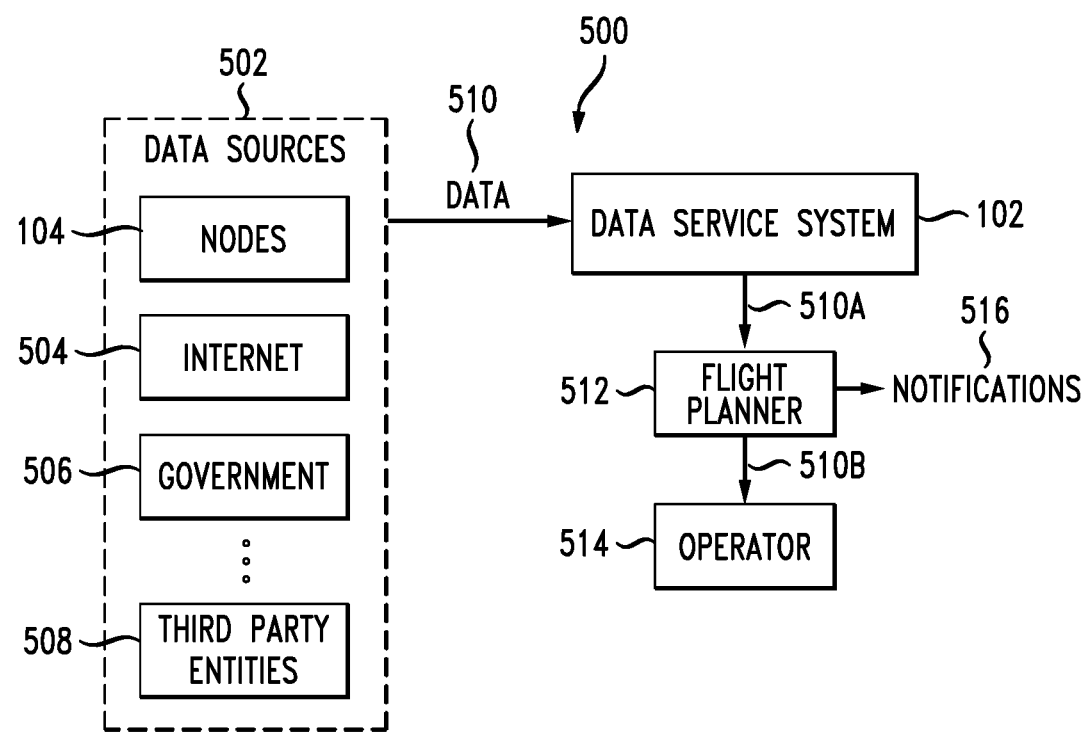
FIG. 5 illustrates a diagram of an example configuration for a sensor-based object discovery and data collection system.

FIG. 5 illustrates a diagram of an example configuration 500 for a sensor-based object discovery and data collection system. In this example, the data service system 102 collects data 510 from data sources 502. The sources 502 can include the nodes 104, the Internet 504, one or more government agencies 506, and third-party entities 508. The nodes 104 includes radars 110 configured in a defined topology across a geographic region as described with reference to FIG. 3A. The nodes 104 can also include other sensors 106 and/or servers 108 as previously explained.

The data 510 can include data and measurements collected from the radars 110. The data 510 can also include other data collected from sensors 106 and/or servers 108. For example, the data 510 can include video, images, and other sensor measurements or data from sensors 106, and/or information collected and/or calculated by the servers 108. The data from the nodes 104 can be used to detect objects and conditions in one or more areas (e.g., 200), track statistics and patterns of objects and conditions in the one or more areas, predict objects and conditions in the one or more areas, etc. The data from the nodes 104 can also be used to calculate flight and/or airspace density or congestion, paths, traffic patterns (e.g., speed, volume, vehicle category, time sequence data, construction status and management, travel incidents, etc.), etc.

The data 510 can also include information obtained from the Internet 504 and one or more government agencies 506, such as traffic and airspace rules and regulations, information about restricted locations and airspaces (e.g., 402, 404A-D), licensing information, security information, use taxes and fees, electronic ticketing information, zone information, weather information, business activity, etc. The data 510 can also include information from the third-party entities 508, such as contracts, notifications, transactions, requests, parameters, alerts, etc.

The data service system 102 can collect the data 510 and store it for use or access by the data service system 102, flight planner 512, operator 514, etc. The data service system 102 can store the data 510, organize or categorize the data 510, fuse the data 510 based on one or more factors (e.g., geographic areas, data categories, dates, sources, topics, relevance, etc.), filter the data 510, sanitize the data 510, enhance the data, etc. The data service system 102 can provide access to the data 510 for use by the flight planner 512, operator 514, and/or any other system, service, or entity. In some examples, the data service system 102 can provide access to a repository of the data 510 and/or specific (e.g., requested, queried, etc.) portions of the data 510 based on a fee, subscription, per transaction, per volume, etc. The data service system 102 can also analyze the historical data and use machine learning and artificial intelligence to predict future obstacles or future conditions of the airspace, and this data can then be used for advanced scheduling of airborne vehicles through the space.

The data service system 102 can also monitor the data 510, analyze the data 510, and generate outputs (e.g., the raw data, relevant data for a region, flight plans or schedules, flight alterations, drone delivery paths and settings, zone management plans, etc.). For example, the data service system 102 can analyze the data 510 and apply machine learning or artificial intelligence to generate responses or recommendations for aircrafts (e.g., flight plans, flight alterations, etc.), traffic controllers (e.g., flight schedules and routes, flight alterations, street level traffic management plans, etc.), insurance companies (e.g., weather conditions or predictions, damage assessments, damage patterns, etc.), traders (e.g., object movement and activity reports, travel reports, delivery or sales reports, etc.), construction or city planners (e.g., regional activity reports or recommendations), government agencies (e.g., warnings, emergency alerts, traffic notifications, regulatory violation alerts, etc.), etc. The data can include through machine learning a prediction of future conditions of the airspace which can be used for advanced reservations. For example, the routing service can utilize advances reservations where a drone can reserve certain space in the 3D space at a certain time based on the received data. The system can also provide details about the route of the airborne vehicle such as variations in height, speed, timing, and so forth based on the information about the airspace and expected objects along the potential route.

Based on the data 510, the data service system 102 can provide data 510A to flight planner 512 which can use the data 510A to generate and alter flight plans. For example, flight planner 512 can use the data 510A from the data service system 102 to schedule, plan and manage drone or aircraft deliveries (e.g., product deliveries), private and/or commercial transportation services, etc. The flight planner 512 can be, for example, a transportation service, a distributor, a traffic control service, a delivery service, a planning service, a routing service, etc.

The data 510A can include detected objects and conditions, traffic patterns, regulatory and enforcement information (e.g., restricted locations and airspaces, use fees, use taxes, etc.), zoning information, weather information, the data 510, relevant data for a region, flight plans or schedules, conditions of the airspace, historical information, future predicted conditions of the airspace, etc. The data service system 102 can provide the data 510A in an aggregated, formatted, organized, fused, filtered, and/or sanitized manner to the flight planner 512. Such data can be provided as requested by the flight planner and/or as determined by the data service system 102. In some cases, the data service system 102 can also provide such data to the flight planner 512 (and/or any other system or entity) according to a predetermined business or contractual model. For example, the data service system 102 can provide such data to the flight planner 512 on a fixed fee basis per request or per flight (or calculation), per distance (e.g., traveling distance, geographic area associated with the accessed data, etc.), per subscription (e.g., monthly, daily, yearly, etc.), per volume (e.g., size of the data, number of files, number of sources, etc.), and so forth.

The flight planner 512 can obtain the data 510A and generate notifications 516, such as flight alteration notifications, regulatory alerts, emergency alerts, warnings, flight condition alerts, flight schedule or plan notifications, environment alerts, flight security risk alerts, etc. The flight planner 512 can send the notifications 516 to a requesting system or entity, such as a server or company, or a predetermined system or entity such as a government agency, an alert or broadcast system, an air traffic controller, a contractor (e.g., city planner, construction contractor, developer, transportation expert, etc.), regulatory body (e.g., law enforcement, lawmakers, etc.), etc.

The flight planner 512 can receive requests 510B from an operator 514 for flight plans, deliveries, transportation operations, travel schedules, etc. The operator 514 can be, for example, a merchant or seller, a distributer, an online store, a government agency, a delivery service, a transportation service, a business, etc. For example, the operator 514 can be an online seller of goods, and the flight planner 512 can provide a delivery or distribution service for the online seller. In this example, the online seller (514) can send a request 510B to the flight planner 512 for flight plans and/or deliveries of one or more goods sold by the online seller. The request 510B can include the goods, information about the sold goods (e.g., weight, volume, size, identifier, description, etc.), information about the destination of the goods (e.g., recipient name and address, etc.), delivery parameters (e.g., time or date, priority, instructions, etc.), etc. The flight planner 512 can receive the request 510B and generate one or more flight plans for the goods based on the data 510A from the data service system 102. The flight planner 512 can then deliver the goods based on the request 510B and the flight plans, or provide the flight plans and delivery information to an entity which delivers the goods. The flight planner 512 and/or entity which delivers the goods can use the flight plans to deliver the goods via a drone or any other type of vehicle.

In some cases, the flight planner 512 can provide a drone delivery service. The flight planner 512 can receive delivery requests (e.g., 510B) from a seller or buyer (e.g., operator 514), and generate flight and delivery plans for the delivery requests based on the data 510A from the data service system 102. The flight planner 512 can then implement a drone to deliver items (e.g., food, prescriptions, merchandise, etc.) based on the flight and delivery plans. The drone can follow the flight and delivery plans to deliver the items to the destination. The destination can be a specific address or a location associated with a specific address, such as a drone receiving location or device at the specific address. In some aspects, the flight plan can be for a predator drone to be dispatched to remove a problematic drone. The predator drone could cast a net over the offending drone, shoot it down, or perform some other action which impacts its ability to function.

In some configurations, the data service system 102 and/or flight planner 512 can provide an intelligent scheduling service which can utilize flight requests (e.g., 510B), paths or routes, origination sites, destination sites, cargo size, scheduled time, and/or any condition from a plurality of radars (e.g., 110) deployed across one or more geographic areas according to one or more topologies (e.g., mesh, zone based, range based, etc.) to intelligently schedule airborne vehicles (e.g., drones, etc.) through airspace based on one or more of such parameters or data. The conditions from the plurality of radars and/or any of the parameters can be current, historical and/or predicted through machine learning or artificial intelligence. The machine learning and artificial intelligence can enhance and automate the intelligent scheduling of airborne vehicles through space. The respective paths and/or flight plans of airborne vehicles can include a timing, a speed during the flight, a variable speed during the flight, a variable elevation and route to avoid other drones or objects, weather conditions, restricted areas, etc. The scheduling can thus be focused, intelligent, adaptive or dynamic, proactive, predictive, and robust.

Figure 6A:
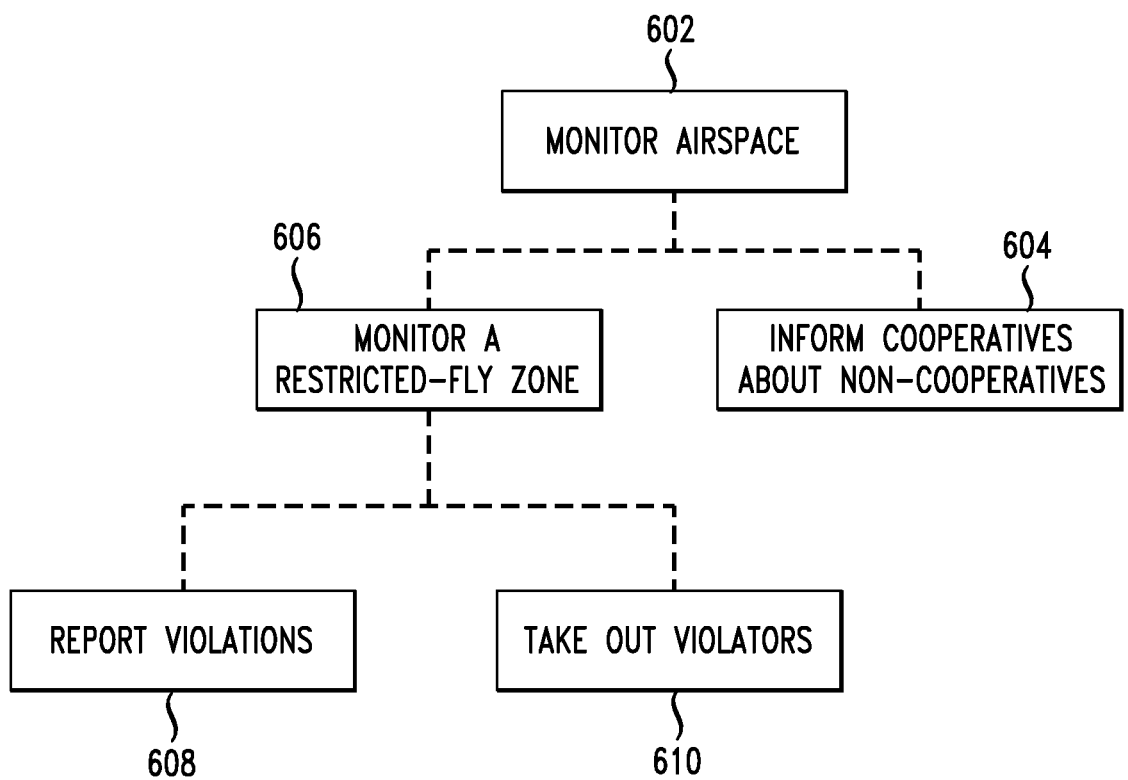
FIG. 6A illustrates a tree diagram of example airspace management and monitoring services.

FIG. 6A illustrates a tree diagram of example airspace management and monitoring services in accordance with various aspects of the disclosure. At a basic level, the system is a scalable solution (which can be software, hardware or a combination of both) that is used to monitor airspace and utilize data for improving the safety or utilization of the airspace. In some examples, the airspace management and monitoring services can be implemented in the example configuration 500 for a sensor-based object discovery and data collection system, as shown in FIG. 5.

In this example, the top node of the tree diagram is an airspace monitoring service 602 with various sub or child nodes representing additional services related to the airspace monitoring service 602. The sub or child nodes include a notification service 604 for informing cooperative aircraft(s) about one or more non-cooperative aircraft(s) and a restricted fly zone monitoring service 606. The restricted fly zone monitoring service 606 can also include sub or child nodes representing additional, related services, including a reporting service 608 for reporting airspace violations and a removal service 610 for taking out airspace violators. The services 602-610 can be supported or performed by the data service system 102 and/or any other component in the configuration 500 of the sensor-based object discovery and data collection system shown in FIG. 5.

The airspace monitoring service 602 can include monitoring objects and conditions in one or more perimeters or geographic areas, as previously explained. The airspace monitoring service 602 can be implemented based on data 510 as shown in FIG. 5. For example, the data service system 102 can receive data 510 from data sources 502, including measurements from radars and other sensors as well as information collected about airspace conditions and regulations, and identify objects (e.g., aircrafts, animals, buildings, trees, obstacles, etc.), conditions (e.g., weather, schedules, emergencies, traffic, visibility, etc.), patterns (e.g., traffic patterns, weather patterns, flight patterns, etc.), predictions (e.g., traffic, weather, problems, etc.), and/or events (e.g., emergencies, flight alterations, government events, natural events, etc.), and so forth, based on the data 510, as previously explained.

The notification service 604 informs cooperative aircrafts about non-cooperative aircrafts in airspace. A non-cooperative aircraft does not communicate its position to other aircraft or surveillance entities and/or are not equipped with transponders for communicating its position to other aircraft and/or surveillance entities. Accordingly, cooperative aircrafts and surveillance entities may not always be aware of the non-cooperatives in an airspace or the position of the non-cooperatives in the airspace. This can result in reduced foresight and visibility of objects, traffic, and conditions in the airspace. The notification service 604 can thus report non-cooperatives detected and monitored in airspace to cooperatives and other entities. The notifications can be based on non-cooperatives identified, tracked, and/or monitored through the airspace monitoring service 602.

The restricted fly zone monitoring service 606 can specifically monitor restricted fly zones and detect objects and conditions in the restricted fly zones. A restricted fly zone can include a no-fly zone or a zone where only specifically-authorized aircraft can fly. Any aircraft detected by the radars 110 in a restricted fly zone is in violation of the restricted fly zone restrictions unless specifically authorized to fly in the restricted fly zone. A restricted fly zone can be defined by perimeter boundaries in two dimensions, three dimensions or more dimensions (such as to include time). The restricted fly zone monitoring service 606 can implement specific rules for responding to aircrafts detected within the perimeter boundaries defined for a restricted fly zone. The rules can include, for example, rules for sending alarms or notifications via a multitude of options, rules for removing from the restricted fly zone any aircraft that is in violation, etc. The rules can be time-based (different rules for day versus night), and could also be implemented based on a certain motorcade in the space, or based on an event such as a football game or a political event.

The violations reporting service 608 can generate and send alarms or notifications when a violation of a restricted fly zone is detected. The violations reporting service 608 can report such violations to other aircraft (e.g., nearby aircrafts) and/or surveillance entities such as government agencies (e.g., Federal Aviation Administration), aircraft operators, etc. The removal service 610 can remove violators from the restricted fly zone. The removal service 610 can generate alerts to the violators requesting the violators to leave the restricted fly zone and/or guiding the violators away from the restricted fly zone. In some cases, the removal service 610 can physically or forcibly remove a violator from the restricted fly zone. For example, the removal service 610 can implement an unmanned aircraft, such as a FORTEM DRONE HUNTER by FORTEM TECHNOLOGIES of Salt Lake City, UT, to capture the violator and remove the violator from the restricted fly zone.

Figure 6B:
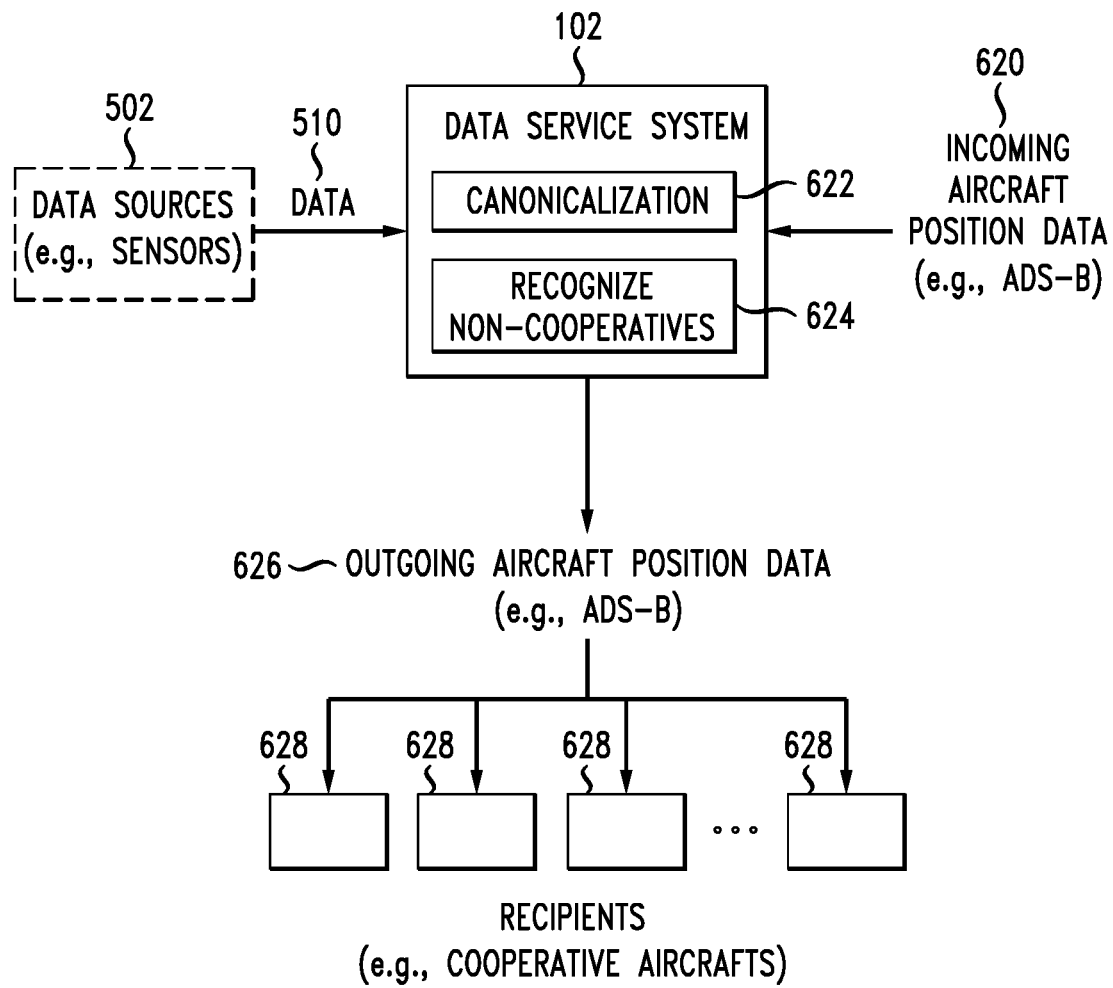
FIG. 6B illustrates a diagram of an example system configuration for implementing a notification service to inform cooperatives about non-cooperatives.

FIG. 6B illustrates a diagram of an example system configuration for implementing the notification service 604 to inform cooperatives about non-cooperatives. Here, the data service system 102 can facilitate airspace safety by providing information to cooperative aircraft about the positions of non-cooperative aircraft in one or more monitored zones. The notifications can be communicated through one or more surveillance or communication technologies, such as Automatic Dependent Surveillance—Broadcast (ADS-B). For example, ADS-B is used by cooperative general aircraft to broadcast their position (e.g., GPS position) and listen for other aircraft's positions. The FAA requires that all manned aircraft be equipped with ADS-B systems by 2020. Smaller ADS-B receives can be mounted on smaller aircraft such as drones to allow such aircraft to implement ADS-B. Accordingly, the ADS-B technologies can be leveraged to inform cooperatives about non-cooperatives and receive position information from cooperatives.

As shown in FIG. 6B, the data service system 102 receives data 510 from data sources 502, including radars 110, to gain insight into the objects, obstacles and conditions in an airspace. The data service system 102 can also receive incoming aircraft position data 620 which helps the data service system 102 track aircraft positions. The incoming aircraft position data 620 includes position information reported by cooperatives using ADS-B and/or any other communication technology.

The data service system 102 can perform canonicalization 622 on the position information in the data 510 and incoming aircraft position data 620 to normalize or standardize the position information into a specific format or representation (e.g., longitude and latitude, altitude, GPS position, etc.). The canonicalization process involves reporting the current position (latitude, longitude and altitude or LLA) as well as the velocity of the object represented as vectors for North, East and Down (VelocityNED). All other representations (e.g. aircraft speed combined with heading) are converted to the LLA and VelocityNED format and common measurements (metric).

The data service system 102 can then recognize non-cooperatives 624 based on the canonicalized data from the incoming aircraft position data 620 and the data 510. For example, the data service system 102 can compare aircraft position information in the data 510 from the data sources 502 (e.g., radars 110, etc.) with aircraft position information in the incoming aircraft position data 620 from cooperatives, to determine which of the detected aircrafts are cooperatives and which are non-cooperatives. The data service system 102 can thus identify and be aware of both cooperatives and non-cooperatives.

After recognizing non-cooperatives, the data service system 102 can transmit outgoing aircraft position data 626 to one or more recipients 628, such as cooperatives. The data service system 102 can communicate the outgoing aircraft position data 626 via ADS-B and/or any other communication technology. The outgoing aircraft position data 626 includes position information for any non-cooperatives recognized by the data service system 102. This way, the data service system 102 can maintain cooperatives informed about non-cooperatives in airspace, including respective position information associated with the non-cooperatives.

In some examples, the data service system 102 can de-duplicate the data 510 prior to comparing it with the incoming aircraft position data 620. For example, the data 510 can include position information from various sources (e.g., sensors 110) that corresponds to the same object (e.g., aircraft) in a same space, such as space 306 in FIG. 3B. Rather than treating the position information as indicative of multiple objects, the data service system 102 can detect that the position information from the various sources refers to the same object and remove any duplicate position information for that object. The data service system 102 can then correlate the deduplicated position information from the data 510 to the position information from the incoming aircraft position data 620 to identify cooperatives and non-cooperatives.

In some cases, any flying object (e.g., bird, balloon, hobbyist drone, etc.) detected by the radars 110 that is not communicating its position can be deemed to be a non-cooperative. The data service system 102 can then act as a proxy for that object and broadcast its position to other objects (e.g., aircrafts) nearby.

Figure 7:
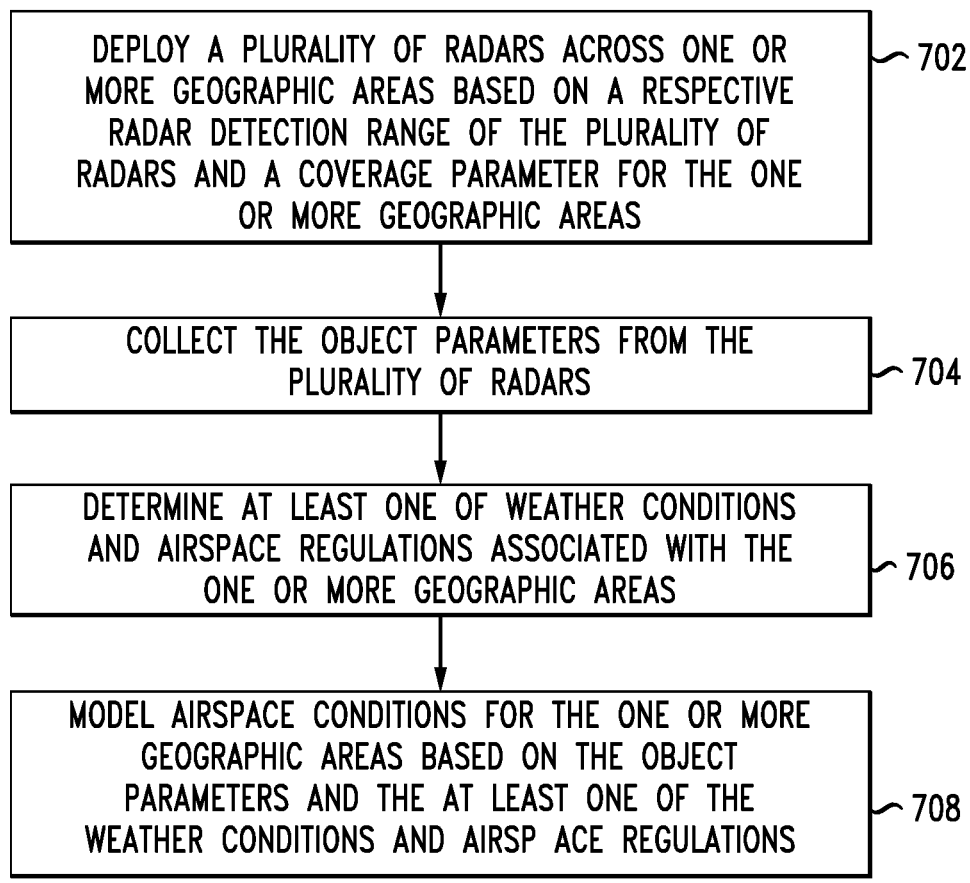
FIG. 7 illustrates a method for sensor-based object discovery and traffic data collection and management.
Figure 8:
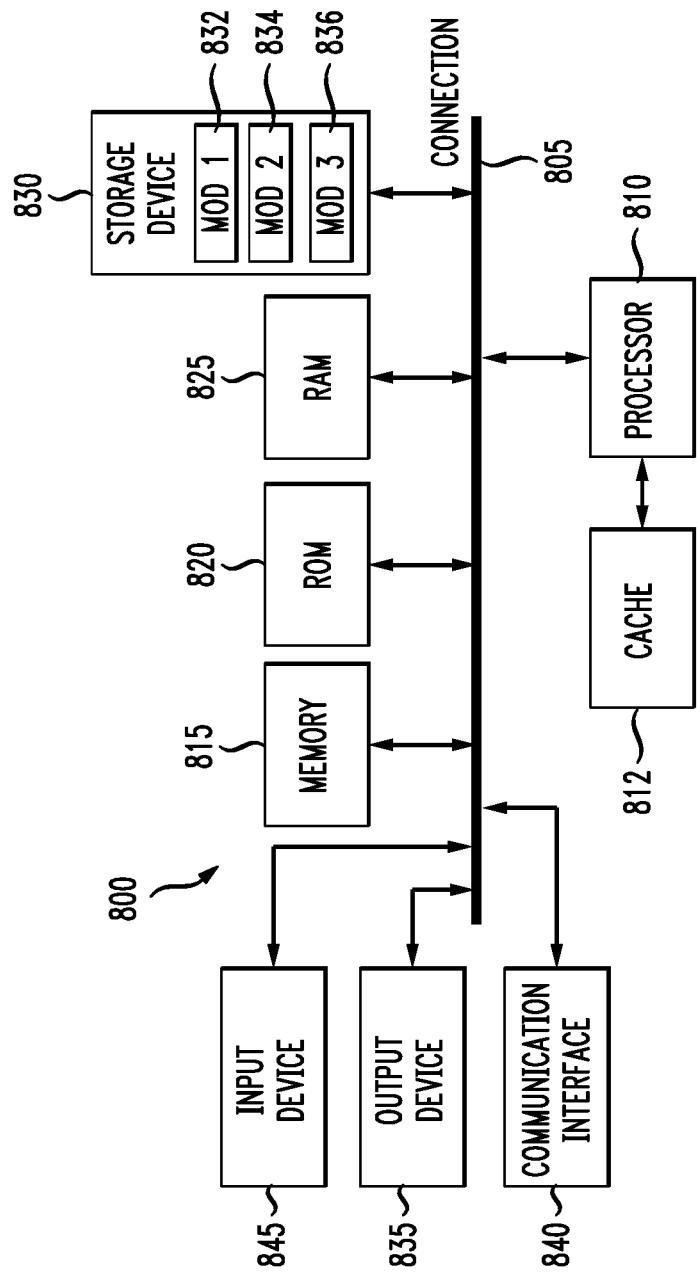
FIG. 8 illustrates an example computing device.

Having disclosed example system components and concepts, the disclosure now turns to the example method for sensor-based object discovery and path management, as shown in FIG. 7. For the sake of clarity, the method is described with reference to the data service system 102 and nodes 104, configured to perform the various steps in the method. The steps outlined herein are examples and can be implemented in any combination thereof, including combinations that exclude, add, or modify certain steps.

At step 702, the data service system 102 deploys a plurality of radars (e.g., radars 110) across one or more geographic areas (e.g., 200) based on a respective radar detection range (e.g., 304A-H of the plurality of radars and a coverage parameter for the one or more geographic areas. The plurality of radars can be configured to detect object parameters within the respective radar detection range. The object parameters can include an object presence, an object range, an object velocity, an object direction, an object size, an object shape, an object composition, etc.

Moreover, the coverage parameter can include a detection accuracy (e.g., a threshold confidence or accuracy level) and a coverage preference (e.g., full area coverage, partial area coverage, custom area coverage, etc.). In some cases, the detection accuracy can be based on the respective radar detection range of the radars. For example, the radars can be deployed within an area of coverage below their maximum detection range or below their maximum detection range. As the range of coverage of the radars within the deployment is reduced relative to their maximum range, the accuracy of the radars can increase. The data service system 102 can be configured to ignore data collected by the radars covering areas exceeding their calculated range of coverage for the specific accuracy desired.

In some aspects, the range of the radars or other nodes can be flexible. For example, if an object appears in one zone, and the data service system 102 desires more accurate data on that object, the data service system 102 could expand the range of a neighboring radar such that more overlap occurs in the location of the object. The expansion of the range could provide data from more than one or two radars (or any other sensor). The data service system 102 can utilize its analysis tools to correlate the data from different radars to capture more accurate data about the object. The updated data can be used to establish or modify flight paths for airborne vehicles or other purposes. Thus, the range of each radar node can be dynamically expandable or retractable based on triggering events, scheduled events, adjusted events, and so forth. The overlapping algorithms could also be adjusted where such changes cause overlap or change an overlap in a region.

In some examples, the plurality of radars are deployed by determining the respective radar detection range of each radar and positioning the plurality of radars at relative locations across the one or more geographic areas based on the respective radar detection range and an area of coverage within the one or more geographic areas. The area of coverage can refer to which portions, regions, and/or percentage of the one or more geographic areas are to be covered by the radars. In some cases, the area of coverage can be based on a coverage parameter (e.g., a coverage percentage, a custom coverage area or region, etc.) and/or a size of the one or more geographic areas.

The data service system 102 can calculate respective coverage regions (e.g., 304A-H) within the one or more geographic areas for the plurality of radars based on the respective radar detection range and the coverage parameter, and position the plurality of regions within the one or more geographic areas based on the respective coverage regions calculated. In some cases, the radars can be positioned such that the respective coverage regions come within a threshold distance of each other. In some cases, the radars can be positioned such that at least a portion of the respective coverage regions overlap or intersect. The data service system 102 can use data from overlapping regions for data redundancy, data or measurement verification, load balancing, etc. Moreover, the data service system 102 can fuse, filter or merge data from overlapping regions to prevent duplicate data.

The data service system 102 can also deploy other sensors or nodes (e.g., nodes 104) across the one or more geographic areas. The sensors or nodes can collect sensor data for various conditions or parameters. For example, the sensors or nodes can capture images or video, audio, measure object altitude, speed, ambient light, air flow, air pressure, temperature, etc.

At step 704, the data service system 102 collects the object parameters (e.g., data 510) from the plurality of radars. The data service system 102 can collect the object parameters periodically at one or more intervals, upon request, as obtained by the radars, or in response to a triggering condition such as an event. In some cases, the radars can push the object parameters to the data service system 102. Thus, the data service system 102 can collect the object parameters as the radars push the data.

At step 706, the data service system 102 can determine weather conditions and/or airspace regulations associated with the one or more geographic areas. The data service system 102 can determine weather conditions based on weather information collected from one or more weather sensors and/or weather sources (e.g., the Internet, a weather reporting service, etc.). The weather conditions can include, for example, a pressure, a moisture, a temperature, a wind, precipitation amount and/or type, air flow or currents, a weather event (e.g., tornado, hurricane, storm, etc.), etc. Moreover, the data service system 102 can determine airspace regulations based on rules, regulations, enforcement policies, etc., defined by a regulatory body, such as a government agency. The airspace regulations can include restricted locations (e.g., 402), restricted airspaces (e.g., 404A-D), licensing regulations, use tax regulations, electronic ticketing requirements, zoning rules, etc.

At step 708, the data service system 102 can model airspace conditions for the one or more geographic areas based on the object parameters, the weather conditions, and/or the airspace regulations. The airspace conditions can include data formatted, fused, filtered, aggregated, modeled, etc., from the object parameters, the weather conditions, and/or the airspace regulations. The data service system 102 can store the airspace conditions and periodically collect data pertaining to the airspace conditions for access by other systems or entities. The data service system 102 can also utilize the vehicle size, cargo weight, cargo shape, vehicles size and/or shape, and so forth to make decisions. For example, if a drone has a large cargo size and the weather pattern calls for a large amount of headwind, the data service system 102 can utilize that information to reroute the drone and cargo to a lower altitude or different route, or change the time to render the delivery more efficient.

In some examples, the data service system 102 can generate flight plans and/or flight notifications based on the airspace conditions. The flight plans can include flight schedules, flight paths or routes, flight priorities, flight alterations, flight settings, etc. In some cases, the data service system 102 can receive requests for data (e.g., airspace conditions) from one or more other systems and provide the data as requested. The other systems can use the data to generate the flight plans or notifications, or process delivery requests. For example, a flight planning service can retrieve the data from the data service system 102 and generate flight plans and delivery instructions for distributing items or products to a destination location using aircrafts such as drones. The flight planning service can provide such service to an operator such as a seller based on a delivery request from the operator. In some cases, the flight planner can manage the flight and delivery for the operator. The data service system 102, flight planner, and/or operator can be part of a same system or entity, or can be part of different entities or systems.

The flight planning can also take into account service level agreements which can be for one or more of a buyer, a seller, a deliverer, a government entity, based on government regulations, or a party receiving a delivery. These agreements can include a length of time from pickup to delivery, speed of delivery, temperature of delivery (warm temperature or cold temperature), elevation restrictions, shaking restrictions, and so forth.

In another aspect, the method can include any entity deploying a plurality of radars across one or more geographic areas based on a respective radar detection range of the plurality of radars and a coverage parameter for the one or more geographic areas, wherein each of the plurality of radars is configured to detect object parameters within the respective radar detection range, collecting, via a data service system, the object parameters from the plurality of radars, determining, via the data service system, at least one of weather conditions and airspace regulations associated with the one or more geographic areas and modeling airspace conditions for the one or more geographic areas based on the object parameters and the at least one of the weather conditions and airspace regulations. The method can also include the functions performed on a deployed network of a plurality of radars across a region. Each of the plurality of radars can be configured to detect object parameters within the respective radar detection range. The data service system collects object parameters from the plurality of radars, determines at least one of weather conditions and/or airspace regulations associated with the region and models airspace conditions for the region based on the object parameters and the at least one of the weather conditions and airspace regulations. The data service system can provide the data to a scheduling module or any other entity for use in scheduling objects in or otherwise managing the airspace in the region. The data could also be used to manage land-based vehicle usage in the region.

The processes disclosed herein represent new approaches to generating new data about the use of airspace in the region which data can then be applied to schedule flying objects to travel through the airspace with improved safety and likelihood of successful meeting SLA requirements for delivering an object to a destination.

The disclosure now turns to FIG. 8, which illustrates an example computing system including various hardware components, which can be used to implement the data service system 102 and/or any other computing device herein.

In this example, FIG. 8 illustrates a computing system architecture 800 including components in electrical communication with each other using a connection 805, such as a bus. System 800 includes a processing unit (CPU or processor) 810 and a system connection 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware or software service, such as service 1 832, service 2 834, and service 3 836 stored in storage device 830, configured to control the processor 810 as well as a special-purpose processor where software instructions are incorporated into the actual processor design. The processor 810 may be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include services 832, 834, 836 for controlling the processor 810. Other hardware or software modules are contemplated. The storage device 830 can be connected to the system connection 805. In one aspect, a hardware module that performs a particular function can include the software component stored in a computer-readable medium in connection with the necessary hardware components, such as the processor 810, connection 805, output device 835, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   deploying a plurality of radars across one or more geographic areas based on a respective radar detection range of the plurality of radars and a coverage parameter for the one or more geographic areas, wherein each of the plurality of radars is configured to detect fixed object parameters within the respective radar detection range, the fixed object parameters being associated with fixed objects within the one or more geographic areas;
   collecting, via a data service system, the fixed object parameters from the plurality of radars;
   generating a computer three-dimensional model of airspace conditions for the one or more geographic areas based on the fixed object parameters, airspace regulations and future predicted airspace conditions, based on historical data, of the one or more geographic areas to yield modeled airspace conditions;
   receiving a request for flight plans associated with a specific region within the one or more geographic areas, wherein the request comprises data about goods to be delivered to a destination and wherein a flight plan is generated based on the request and provided to a flying vehicle prior to a flight of the flying vehicle; and
   autonomously moving, based on the modeled airspace conditions and the flight plan, the flying vehicle in the specific region.

2. The method of claim 1, wherein the coverage parameter comprises at least one of a detection accuracy and a coverage preference, the detection accuracy being based on the respective radar detection range.

3. The method of claim 2, wherein deploying the plurality of radars comprises determining the respective radar detection range of each of the plurality of radars and positioning the plurality of radars at relative locations across the one or more geographic areas based on the respective radar detection range and an area of coverage within the one or more geographic areas, the area of coverage being based on at least one of the coverage parameter and a size of the one or more geographic areas.

4. The method of claim 1, further comprising:
   deploying a plurality of sensor devices across the one or more geographic areas; and
   collecting, via the data service system, sensor data from the plurality of sensor devices, wherein generating the three-dimensional model of the airspace conditions for the one or more geographic areas is further based on the sensor data from the plurality of sensor devices, the sensor data being incorporated with the fixed object parameters and the airspace regulations based on a respective relevance to a same portion of the one or more geographic areas.

5. The method of claim 4, wherein the plurality of sensor devices comprise at least one of cameras, image devices, temperature sensors, humidity sensors, and speed sensors, and wherein the sensor data comprises at least one of video, images, temperature information, humidity information, and object velocity information.

6. The method of claim 1, wherein the fixed object parameters comprise at least one of an object presence, an object range, an object size, an object shape, and an object composition and wherein the airspace regulations are one of fixed regulations or dynamic regulations that periodically change.

7. The method of claim 6, further comprising:
   storing the fixed object parameters and the airspace regulations based on one or more commonalities to yield stored data, wherein the one or more commonalities comprise at least one of a geographic area, one or more data sources, an airspace region, a detected condition, and a detected object.

8. The method of claim 7, wherein storing the fixed object parameters and the airspace regulations comprises aggregating portions of the stored data based on the one or more commonalities.

9. The method of claim 1, wherein deploying the plurality of radars across the one or more geographic areas comprises calculating respective coverage regions within the one or more geographic areas for the plurality of radars based on the respective radar detection range and the coverage parameter, wherein at least a portion of the respective coverage regions overlap.

10. A system comprising:
    one or more processors; and
    at least one computer-readable storage medium having stored therein instructions which, when executed by the one or more processors, cause the system to:
    receive, from a data service, airspace information, the airspace information comprising fixed object parameters detected by a plurality of radars deployed across one or more geographic areas, the plurality of radars being deployed based on a respective radar detection range of the plurality of radars and a coverage parameter for the one or more geographic areas, the fixed object parameters being associated with fixed objects within the one or more geographic areas;

based on the airspace information and information about one or more items to be delivered, generate one or more flight plans associated with the one or more geographic areas, the one or more flight plans comprising one or more respective paths for delivering the one or more items to a destination via an aircraft and the one or more flight plans being generated using a three-dimensional model of airspace conditions, the three-dimensional model of airspace conditions being based on the fixed object parameters, airspace regulations and future predicted airspace conditions, based on historical data, of the one or more geographic areas;

provide the one or more flight plans to the aircraft prior to a flight of the aircraft to deliver the one or more items to the destination, wherein the aircraft autonomously moves to the destination based on the one or more flight plans; and monitor flight conditions associated with the one or more flight plans based on data collected from the data service.

11. The system of claim 10, wherein the airspace information further comprises the airspace regulations being associated with the one or more geographic areas, wherein the fixed object parameters comprise at least one of an object presence, an object range, an object size, an object shape, and an object composition and wherein the airspace regulations are one of fixed regulations or dynamic regulations that periodically change.

12. The system of claim 11, wherein the airspace information further comprises at least one of flight congestion associated with the one or more geographic areas, traffic patterns associated with the one or more geographic areas, and the three-dimensional model of airspace conditions associated with the one or more geographic areas.

13. The system of claim 10, wherein the coverage parameter comprises at least one of a detection accuracy and a coverage preference, the detection accuracy being based on the respective radar detection range.

14. The system of claim 13, wherein the fixed object parameters detected by the plurality of radars are associated with relative locations of the plurality of radars across the one or more geographic areas, the relative locations being based on the respective radar detection range and an area of coverage within the one or more geographic areas, the area of coverage being based on at least one of the coverage parameter and a size of the one or more geographic areas.

15. The system of claim 10, wherein the aircraft comprises an unmanned aircraft, and wherein the monitoring of the flight conditions further comprises tracking the unmanned aircraft during the flight.

16. A non-transitory computer-readable storage medium comprising:
instructions stored therein which, when executed by one or more processors, cause a system to:
deploy a plurality of radars across one or more geographic areas based on a respective radar detection range of the plurality of radars and a coverage parameter for the one or more geographic areas, wherein each of the plurality of radars is configured to detect fixed object parameters within the respective radar detection range, the fixed object parameters being associated with fixed objects within the one or more geographic areas;

collect the fixed object parameters from the plurality of radars;

determine airspace regulations associated with the one or more geographic areas;

generate a three-dimensional model of airspace conditions for the one or more geographic areas based on the fixed object parameters, the airspace regulations and future predicted airspace conditions, based on historical data, of the one or more geographic areas to yield modeled airspace conditions; and receive a request for flight plans associated with the one or more geographic areas, wherein the request comprises physical data about goods to be delivered to a destination, wherein a flight plan is generated based on the request and provided to a flying vehicle prior to a flight of the flying vehicle and wherein the flying vehicle autonomously moves to the destination based on the modeled airspace conditions and the flight plan.

17. The non-transitory computer-readable storage medium of claim 16, wherein the coverage parameter comprises at least one of a detection accuracy and a coverage preference, the detection accuracy being based on the respective radar detection range, wherein the fixed object parameters comprise at least one of an object presence, an object range, an object size, an object shape, and an object composition.

18. The non-transitory computer-readable storage medium of claim 17, wherein deploying the plurality of radars comprises determining the respective radar detection range of each of the plurality of radars and positioning the plurality of radars at relative locations across the one or more geographic areas based on the respective radar detection range and an area of coverage within the one or more geographic areas, the area of coverage being based on at least one of the coverage parameter and a size of the one or more geographic areas.

19. The non-transitory computer-readable storage medium of claim 18, wherein the non-transitory computer-readable storage medium stores further instructions which, when executed by the one or more processors, cause the system to:
store the fixed object parameters and the airspace regulations to yield stored data; and
aggregate portions of the stored data based on one or more commonalities, wherein the one or more commonalities comprise at least one of a geographic area, one or more data sources, an airspace region, a detected condition, and a detected object.

20. The non-transitory computer-readable storage medium of claim 18, wherein the airspace regulations are one of fixed regulations or dynamic regulations that periodically change.

* * * * *